US012187361B2

(12) United States Patent
Shin

(10) Patent No.: US 12,187,361 B2
(45) Date of Patent: Jan. 7, 2025

(54) STEER-BY-WIRE STEERING APPARATUS

(71) Applicant: HL MANDO CORPORATION, Pyeongtaek (KR)

(72) Inventor: Kyung Sub Shin, Suwon (KR)

(73) Assignee: HL MANDO CORPORATION, Pyeongtaek (KR)

( * ) Notice: Subject to any disclaimer, the term of this patent is extended or adjusted under 35 U.S.C. 154(b) by 527 days.

(21) Appl. No.: 17/627,850

(22) PCT Filed: Jul. 21, 2020

(86) PCT No.: PCT/KR2020/009574
§ 371 (c)(1),
(2) Date: Jan. 18, 2022

(87) PCT Pub. No.: WO2021/015527
PCT Pub. Date: Jan. 28, 2021

(65) Prior Publication Data
US 2022/0258792 A1 Aug. 18, 2022

(30) Foreign Application Priority Data
Jul. 24, 2019 (KR) .................. 10-2019-0089496

(51) Int. Cl.
*B62D 5/04* (2006.01)
*B62D 5/00* (2006.01)

(52) U.S. Cl.
CPC ........... *B62D 5/0469* (2013.01); *B62D 5/001* (2013.01); *B62D 5/0409* (2013.01); *B60Y 2306/09* (2013.01)

(58) Field of Classification Search
CPC .... B62D 5/0469; B62D 5/001; B62D 5/0409; B62D 5/0445; B62D 5/0421; B62D 5/0424; B62D 5/0448; B62D 15/0225; B60G 9/002; B60Y 2306/09; G01D 11/24
See application file for complete search history.

(56) References Cited

U.S. PATENT DOCUMENTS

| | | | |
|---|---|---|---|
| 5,020,616 A | 6/1991 | Yagi | |
| 6,457,375 B1 | 10/2002 | Buch | |
| 9,254,868 B2 * | 2/2016 | Ando | .................. B60G 17/019 |

(Continued)

FOREIGN PATENT DOCUMENTS

| | | |
|---|---|---|
| CN | 101254795 A | 9/2008 |
| CN | 108357560 A | 8/2018 |

(Continued)

OTHER PUBLICATIONS

Office Action issue d on Jun. 26, 2023 for counterpart German Patent Application No. 112020003502.6.

(Continued)

*Primary Examiner* — Anne Marie M Boehler
(74) *Attorney, Agent, or Firm* — Harvest IP Law, LLP

(57) ABSTRACT

According to a steer-by-wire steering apparatus of the present embodiments, by means of offsetting a gap due to abrasion occurring in a rotation preventing member for preventing the rotation of a sliding bar as the sliding bar connected to wheels slide, noise is reduced, precision of a sensor for sensing the position of the sliding bar is enhanced, and sensor precision degradation due to moving or bending of the sliding bar can be prevented.

14 Claims, 13 Drawing Sheets

(56) References Cited

U.S. PATENT DOCUMENTS

| | | | |
|---|---|---|---|
| 11,427,250 B2* | 8/2022 | Chae | B62D 3/02 |
| 11,981,381 B2* | 5/2024 | Wuebbolt-Gorbatenko | B62D 7/1545 |
| 2014/0353071 A1 | 12/2014 | Ando | |
| 2015/0123366 A1* | 5/2015 | Kuhnt | B62D 15/0225 280/86.75 |
| 2022/0364884 A1* | 11/2022 | Shin | G01D 5/14 |
| 2023/0294757 A1* | 9/2023 | Shin | B62D 5/0445 |
| 2024/0067256 A1* | 2/2024 | Harris | B62D 5/0445 |

FOREIGN PATENT DOCUMENTS

| | | |
|---|---|---|
| DE | 3881197 T2 | 1/1994 |
| DE | 102015204781 A1 | 3/2016 |
| DE | 102018130656 A1 | 6/2019 |
| JP | 2011148494 A | 8/2011 |
| JP | 2014232035 A | 12/2014 |
| KR | 20080107881 A | 12/2008 |
| KR | 1020080107881 A | 12/2008 |
| KR | 20130034710 A | 4/2013 |
| KR | 20190047369 A | 5/2019 |
| WO | 2015140961 A1 | 9/2015 |

OTHER PUBLICATIONS

Application Research on Dynamic Torque Sensor in Mechanical Transmission.
Notice of Allowance issued in Chinese Patent Application No. 202080053369.2 dated Apr. 28, 2024.
Office Action issued in Chinese Patent Application No. 202080053369.2 dated Nov. 28, 2023.

* cited by examiner

STEER-BY-WIRE STEERING APPARATUS

CROSS REFERENCE TO RELATED APPLICATIONS

This application is a National Stage of International Application No. PCT/KR2020/009574 filed Jul. 21, 2020, claiming priority based on Korean Patent Application No. 10-2019-0089496 filed Jul. 24, 2019.

TECHNICAL FIELD

The present disclosure relates to steer-by-wire steering apparatuses, and more specifically, to a steer-by-wire steering apparatus capable of reducing noise by compensating for a gap caused by abrasion on a rotation preventer for preventing a sliding bar from rotating as the sliding bar connected to a vehicle wheel slides, improving accuracy of a sensor for detecting a position of the sliding bar, and preventing the degradation of the accuracy of the sensor due to movement or bending of the sliding bar.

BACKGROUND ART

A steer-by-wire steering apparatus is a type of electrical power assisted steering apparatus, and is an apparatus capable of steering a vehicle by using electrical power without a mechanical connection such as a steering column, a universal joint, and the like between a steering wheel and a front wheel steering apparatus.

The steer-by-wire steering apparatus can steer front wheels or rear wheels, or the steer front and rear wheels. That is, the steer-by-wire steering apparatus can steer the front wheels or the rear wheels by enabling the sliding bar connected to the front wheels or the rear wheels to axially slide.

In such a typical steer-by-wire steering apparatus, as the sliding bar is driven by a motor, and a pinion shaft is not employed, a rotation preventer coupled to the sliding bar and supported by a housing has been used for preventing rotation of the sliding bar.

However, the typical steer-by-wire steering apparatus has suffered from a variety of problems such as the generation of noise due to abrasion on the rotation preventer as the sliding bar slides, the degradation of accuracy of a sensor for detecting a position of the sliding bar, and the like.

DETAILED DESCRIPTION OF THE INVENTION

Technical Problem

To address such issues, embodiments of the present disclosure provide steer-by-wire steering apparatuses capable of reducing noise by compensating for a gap caused by abrasion on a rotation preventer for preventing a sliding bar from rotating as the sliding bar connected to a vehicle wheel slides, improving accuracy of a sensor for detecting a position of the sliding bar, and preventing the degradation of the accuracy of the sensor due to movement or bending of the sliding bar.

Technical Solution

According to aspects of the present disclosure, a steer-by-wire steering apparatus is provided that includes: a housing accommodating a sliding bar being axially slidable, and including a sensor holder including a long hole formed to penetrate inner and outer surfaces and axially extend; a rotation preventer including a supporter that is inserted into the long hole, coupled to the sliding bar, and supported widthwise by the housing, the supporter being divided widthwise into two cut portions such as a first supporter and a second supporter, and an elastic member located between the first supporter and the second supporter; and a sensor assembly including a magnet holder that is coupled with the rotation preventer, is slidable together with the rotation preventer, and accommodates a magnet, and a sensor that is coupled to the sensor holder and detects a position of the magnet.

Effects of the Invention

According to embodiments of the present disclosure, it is possible to provide steer-by-wire steering apparatuses capable of reducing noise by compensating for a gap caused by abrasion on a rotation preventer for preventing a sliding bar from rotating as the sliding bar connected to a vehicle wheel slides, improving accuracy of a sensor for detecting a position of the sliding bar, and preventing the degradation of the accuracy of the sensor due to movement or bending of the sliding bar.

BEST MODE FOR CARRYING OUT THE INVENTION

Figure 1:
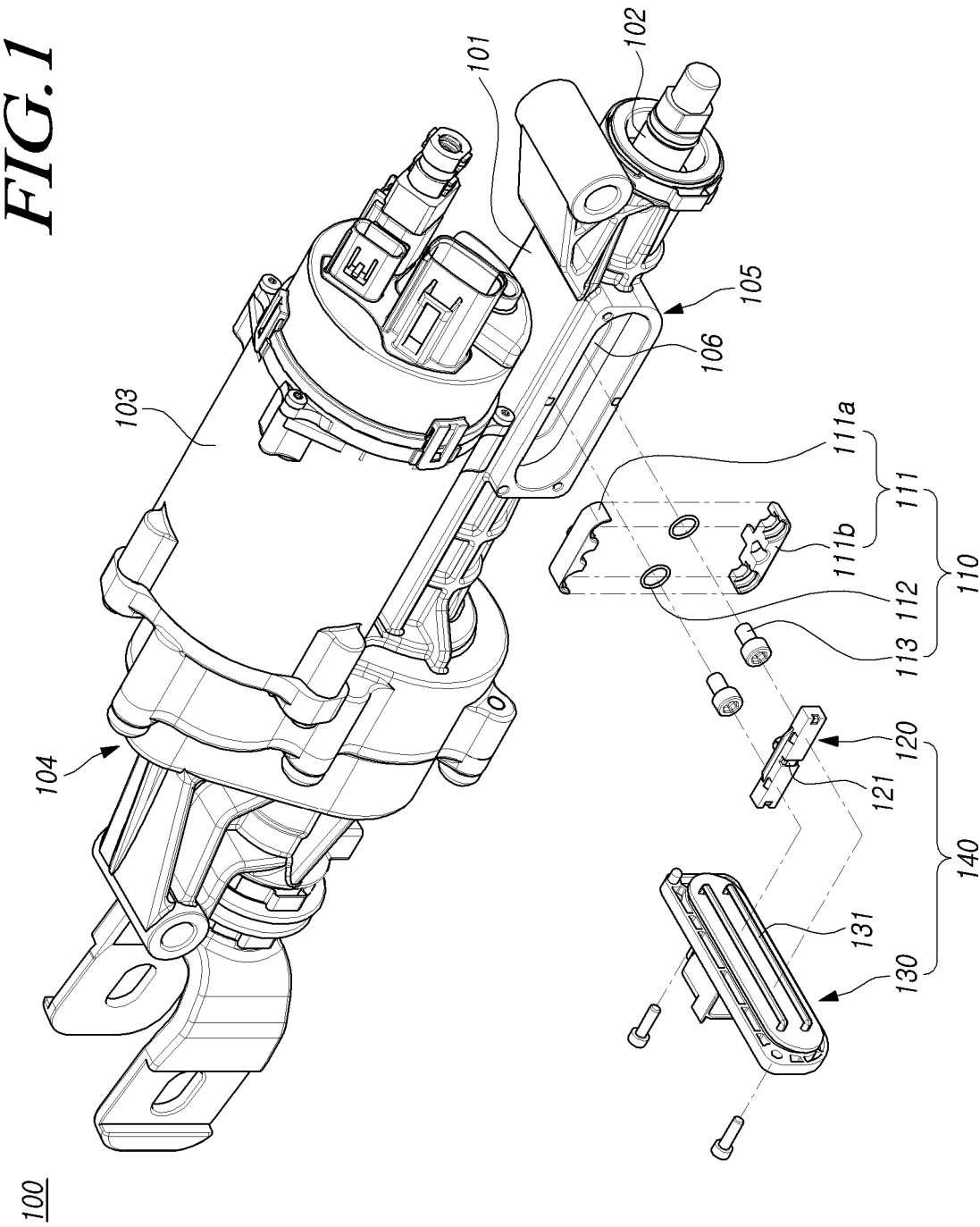
FIG. 1 is an exploded perspective view of a steer-by-wire steering apparatus according to aspects of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
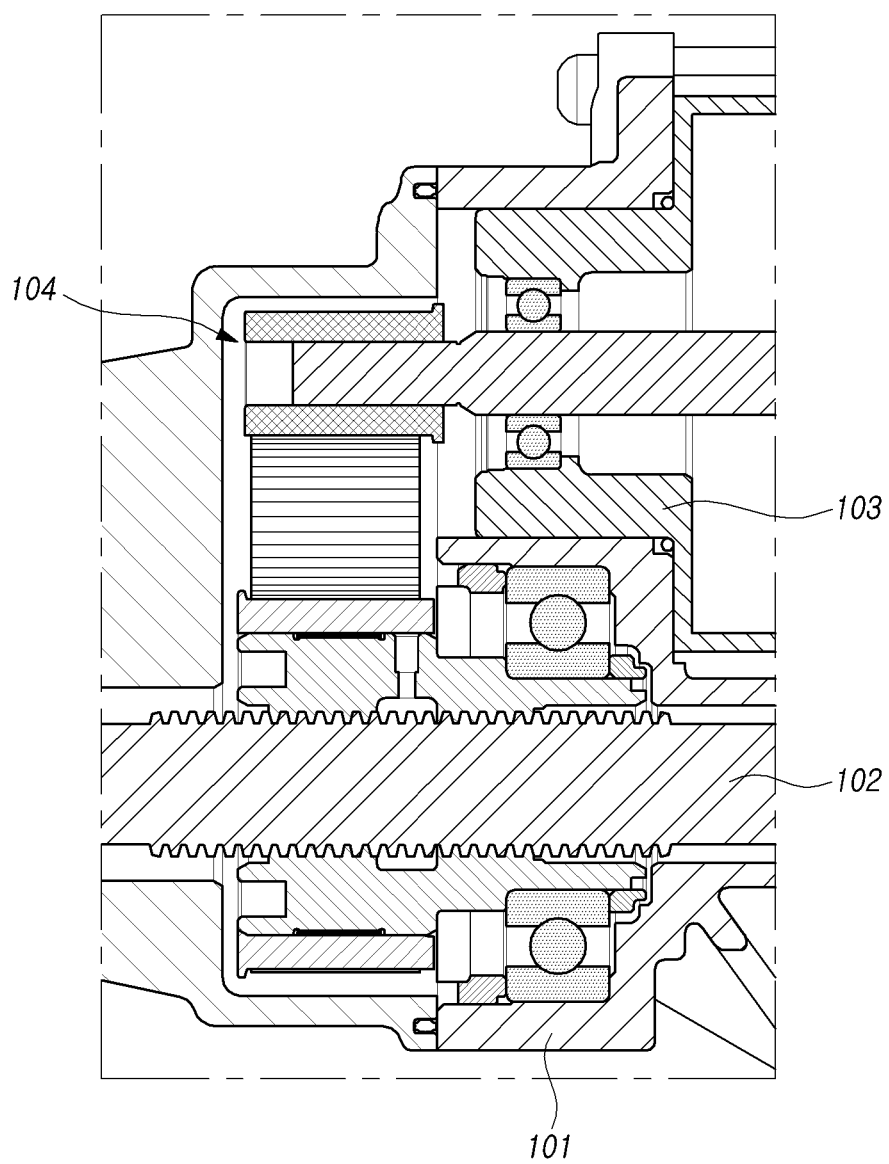
FIG. 2 is a partial cross-sectional view of the steer-by-wire steering apparatus according to aspects of the present disclosure.
Figure 3:
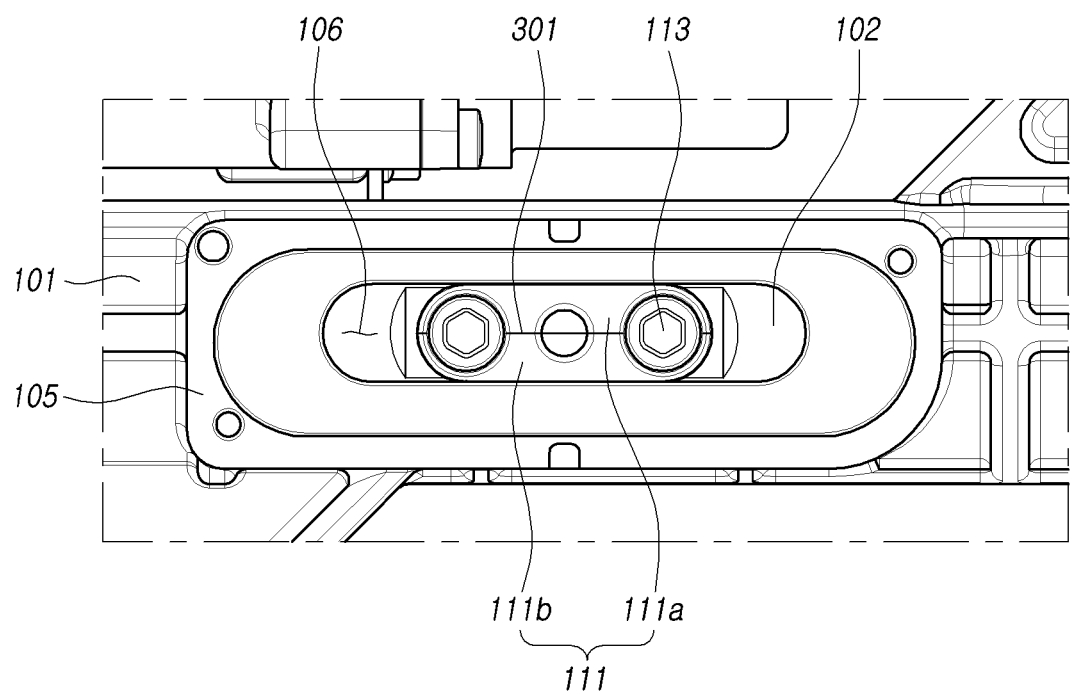
FIG. 3 is a partial side view of the steer-by-wire steering apparatus according to aspects of the present disclosure.
Figure 4:
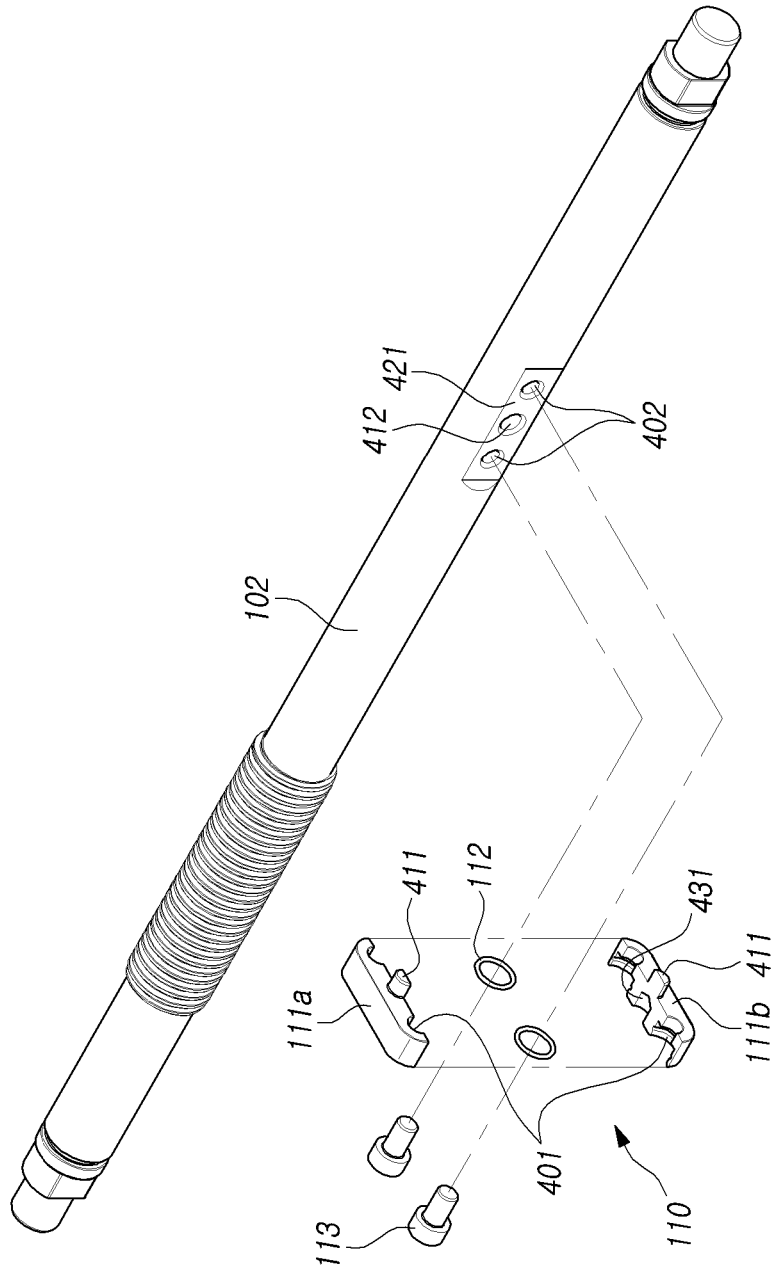
FIGS. 4, 5, 6, and 7 are partial perspective views of the steer-by-wire steering apparatus according to aspects of the present disclosure.
Figure 5:
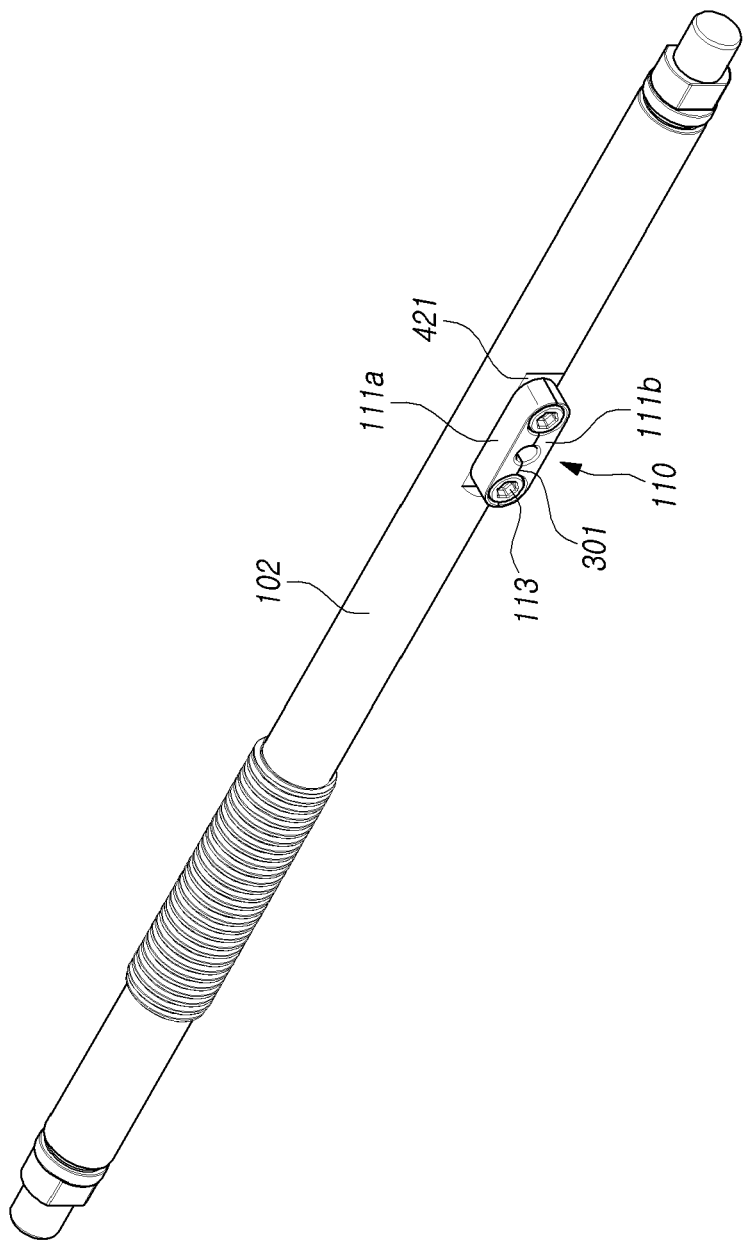
Figure 6:
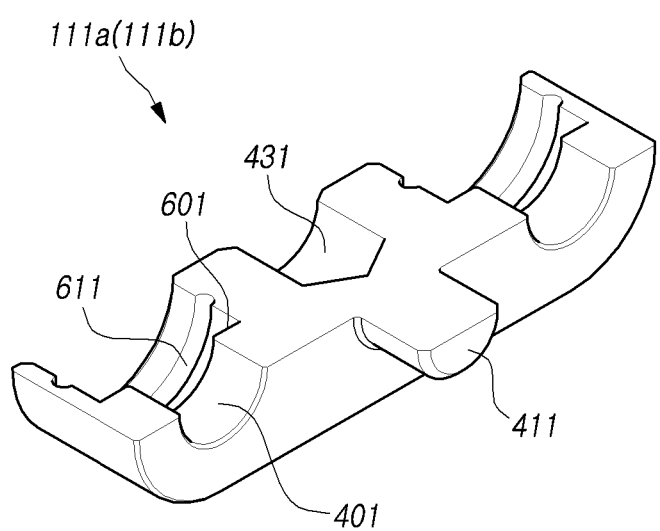
Figure 7:
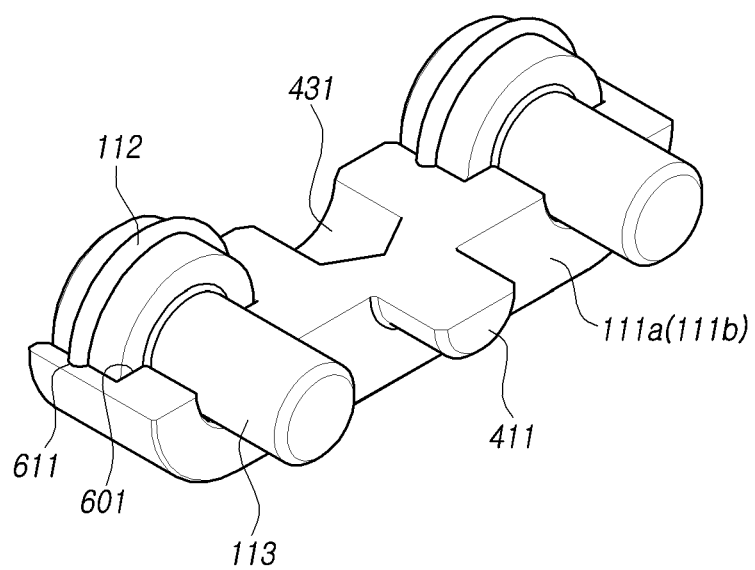
Figure 8:
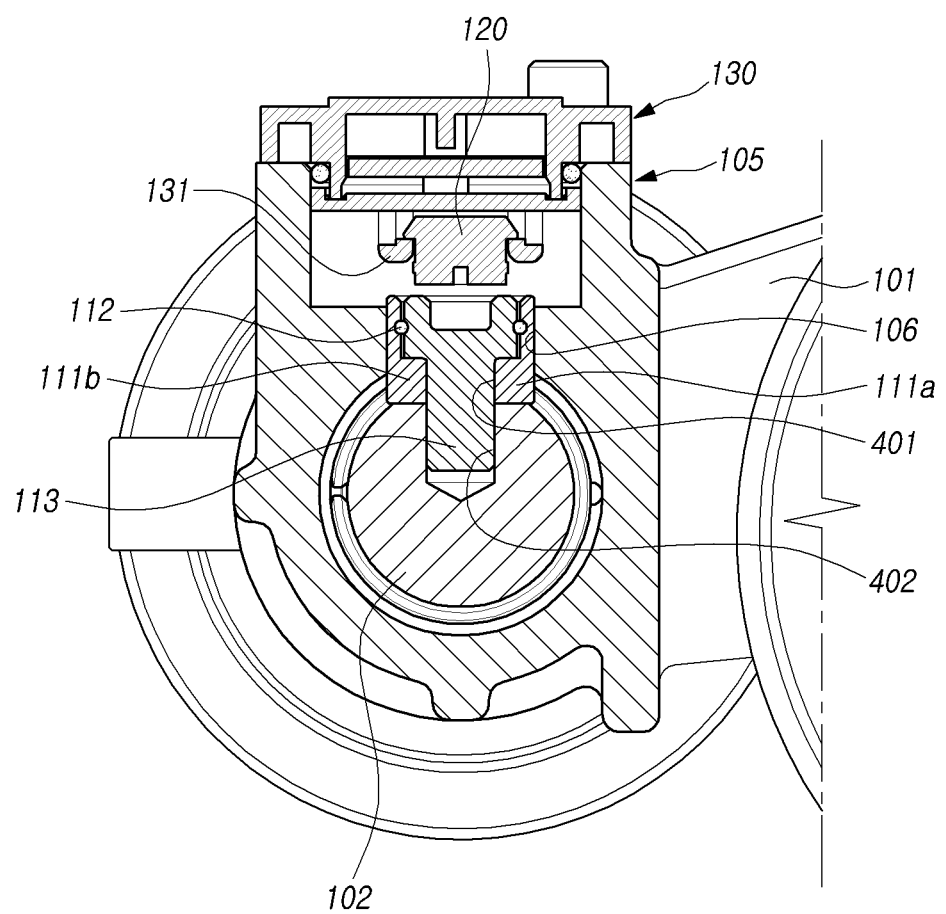
FIGS. 8, 9, 10 and 11 are partial cross-sectional views of the steer-by-wire steering apparatus according to aspects of the present disclosure.
Figure 11:
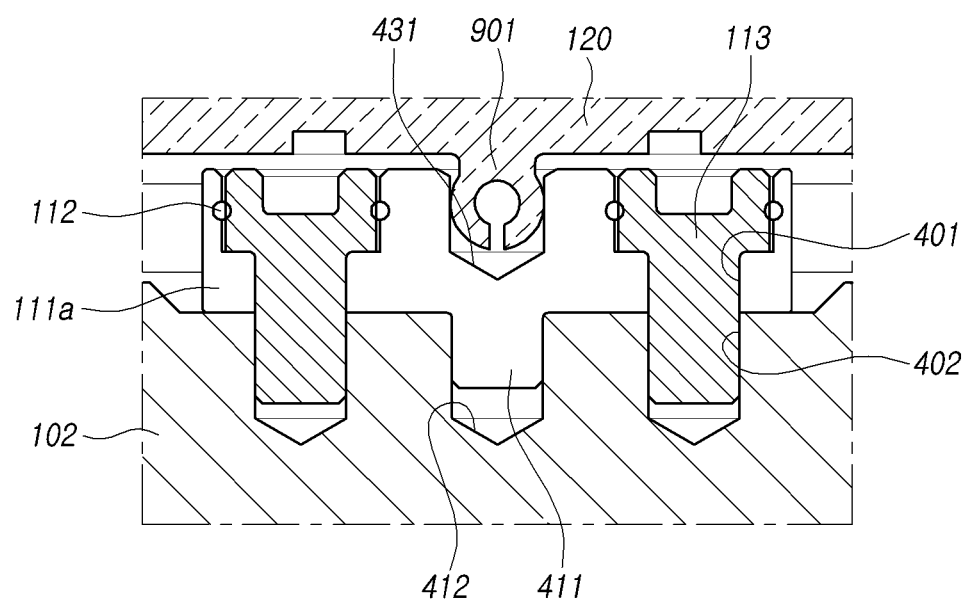
Figure 12:
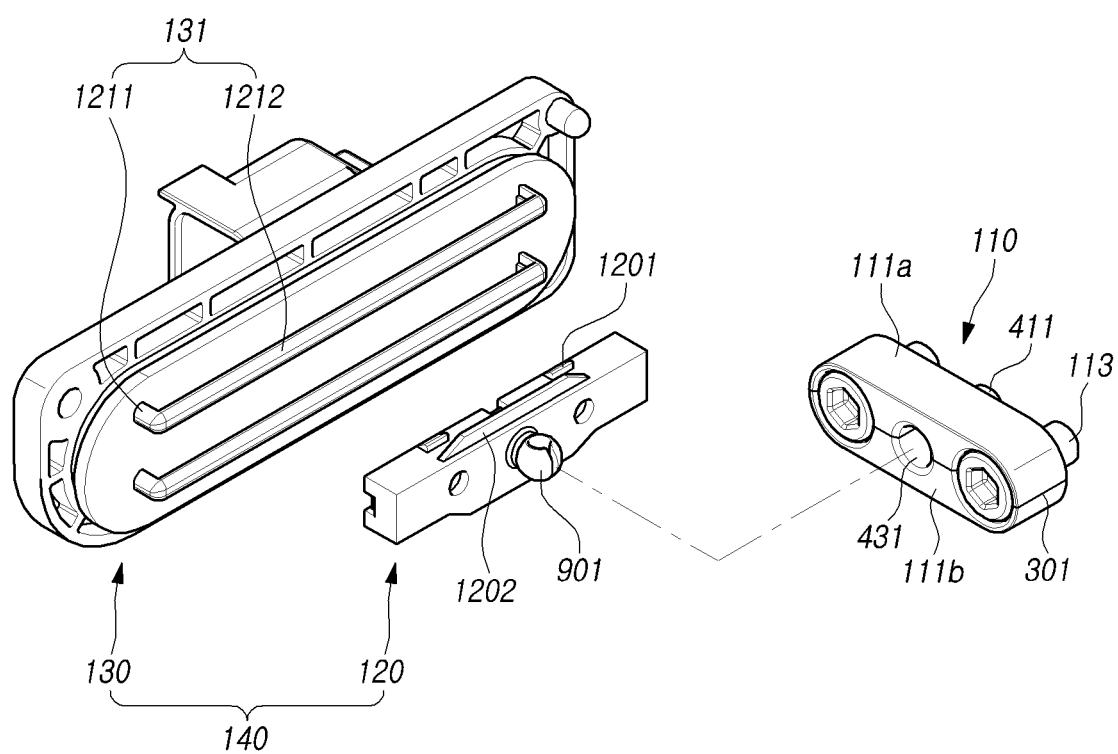
FIGS. 12 and 13 are partial perspective views of the steer-by-wire steering apparatus according to aspects of the present disclosure.
Figure 13:
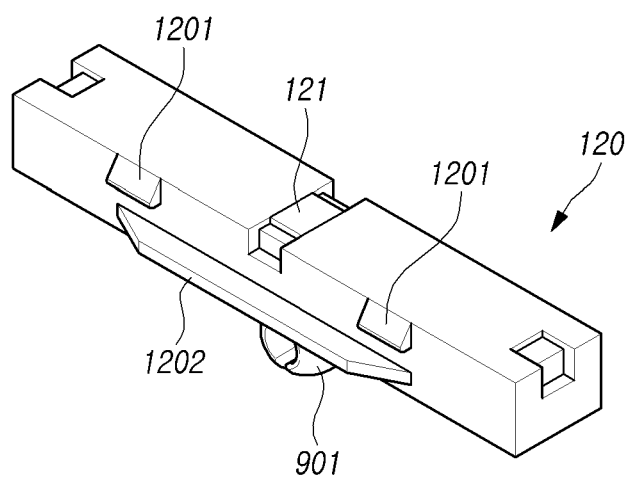

FIG. 1 is an exploded perspective view of a steer-by-wire steering apparatus according to aspects of the present disclosure. FIG. 2 is a partial cross-sectional view of the steer-by-wire steering apparatus according to aspects of the present disclosure. FIG. 3 is a partial side view of the steer-by-wire steering apparatus according to aspects of the present disclosure. FIGS. 4 and 7 are partial perspective views of the steer-by-wire steering apparatus according to aspects of the present disclosure. FIGS. 8 and 11 are partial cross-sectional views of the steer-by-wire steering apparatus according to aspects of the present disclosure. FIGS. 12 and 13 are partial perspective views of the steer-by-wire steering apparatus according to aspects of the present disclosure.

The steer-by-wire steering apparatus 100 according to aspects of the present disclosure includes: a housing 101 accommodating a sliding bar 102 being axially slidable, and including a sensor holder 105 including a long hole 106 formed to penetrate inner and outer surfaces and axially extend; a rotation preventer 110 including a supporter 111 that is inserted into the long hole 106, coupled to the sliding bar 102, and supported widthwise by the housing 101, the supporter 111 being divided widthwise into two cut portions 301 such as a first supporter 111a and a second supporter 111b, and further including an elastic member 112 located between the first supporter 100a and the second supporter 111b; and a sensor assembly 140 including a magnet holder 120 that is coupled with the rotation preventer 110, is slidable together with the rotation preventer 110, and accommodates a magnet 121, and a sensor 130 that is coupled to the sensor holder 105 and detects a position of the magnet 121.

Referring to FIG. 1, the sliding bar 102 of the steer-by-wire steering apparatus 100 according to aspects of the present disclosure can receive a torque from a motor 103 and axially slide inside of the housing 101. Both edges of the sliding bar 102 are connected to front wheels or rear wheels, and the front wheels or the rear wheels can be steered as the sliding bar 102 axially slides.

For convenience of description, FIG. 1 illustrates an embodiment in which a connector connected to a knuckle is coupled to only one of both ends of the sliding bar 102.

The torque of the motor 103 is converted by a power transmitter 104 so that the sliding bar 102 can axially slide.

Referring to FIG. 2, the power transmitter 104 may include a motor pulley, a belt, a nut pulley, a ball nut, and the like. Since these components are widely used, discussions on them will be omitted.

That is, if steering related information detected by a torque sensor, an angle sensor, or the like coupled to a steering shaft is transmitted to the motor 103, the torque of the motor 103 can be converted by the power transmitter 104 to enable the sliding bar 102 to axially slide.

The sensor assembly 140 may include the sensor 130 and the magnet holder 120. As the magnet holder 120 can be guided by a guide portion 131 of the sensor 130 and be located to slide together with the sliding bar 102, the sensor 130 can detect a position of the sliding bar 102 based on a position of the magnet 121, and thereby, determine whether the sliding bar 102 has moved to a set target position by the manipulation of a steering wheel by a driver. Discussions thereon will be conducted in further detail below.

Meanwhile, in order for the sliding bar 102 to axially slide, it is desired to provide a configuration capable of preventing rotation of the sliding bar 102 so that the sliding bar 102 can be circumferentially fixed.

Referring to FIGS. 1 and 3, the housing 101 may be provided with the sensor holder 105 including the long hole 106 formed to penetrate inner and outer surfaces and axially extend. In this case, the rotation preventer 110 may be coupled to the sliding bar 102 with being inserted into the long hole 106, and include the supporter 111 supported widthwise by the housing 101.

That is, as the supporter 111 is axially movable in the long hole 106 with being inserted into the long hole 106, and both widthwise side surfaces of the supporter 111 are supported by the housing 101, thereby, the rotation of the sliding bar 102 coupled with the supporter 111 can be prevented.

There may be present a gap between the supporter 111 and the housing 101 due to assembly tolerance, abrasion of the supporter 111, etc. If such a gap is not compensated, there may be generated noises as the supporter 111 collides with the housing 101 due to road impact, etc., and in turn, such noises lead the steering feel of the driver to become poor.

As will be described in further detail below, as the magnet holder 120 is slidable together with the rotation preventer 110 with being coupled to the rotation preventer 110, and the sensor 130 determines a position of the sliding bar 102 by detecting a position of the magnet 121 accommodated in the magnet holder 120, if there is present a gap between the supporter 111 and the housing 101, there may arise a problem in which a widthwise movement caused in the supporter 111 is transmitted to the magnet 121, and thereby, the accuracy of the sensor 130 is degraded.

Therefore, to solve the above problems by compensating for the gap between the supporter 111 and the housing 101, the supporter 111 may be divided widthwise into two cut portions 301, such as the first supporter 100a and the second supporter 111b, and the rotation preventer 110 may include an elastic member 112 located between the first supporter 100a and the second supporter 111b.

That is, as the elastic member 112 may be located between the first supporter 100a and the second supporter 111b, and can elastically support each of the first supporter 100a and the second supporter 111b widthwise and outwardly, thereby, such a gap between the supporter 111 and the housing 101 can be compensated for.

Referring to FIGS. 4 to 7, the rotation preventer 110 may further include a coupling member 113 that is inserted into a first coupling hole 401 formed in the supporter 111 and divided into two cut portions 301, and a second coupling hole 402 formed in the sliding bar 102. The elastic member 112 may be located between an outer surface of the coupling member 113 and an inner surface of the first coupling hole 401.

As shown in the figures, the first supporter 100a and the second supporter 111b may be formed symmetrically. In this case, the first coupling hole 401 may be divided into two cut portions 301, and the two cut portions 301 of the first coupling hole 401 may be formed in the first supporter 100a and the second supporter 111b, respectively.

The elastic member 112 may be located inside of the first coupling hole 401 to be located between the first supporter 100a and the second supporter 111b, and the coupling member 113 may be inserted into the first coupling hole 401 and the second coupling hole 402 in a situation where the supporter 100a and the second supporter 111b have been inserted into the long hole 106.

The sliding bar 102 may be provided with a chamfered portion 412 for supporting the supporter 111, and thereby, the second coupling hole 402 may be formed in the chamfered portion 412.

The coupling member 113 may be screwed to the second coupling hole 402, and the first coupling hole 401 may include a step portion 601 in which a head portion of the coupling member 113 is supported. Thereby, the first supporter 100a and the second supporter 111b can be fixed to the sliding bar 102 in the long hole 106.

As shown in the figures, the elastic member 112 may be located to be supported on an outer surface of the head portion of the coupling member 113.

The first coupling hole 401 may include an inner circumferential groove 611 into which the elastic member 112 is inserted, and thereby, the elastic member 112 can be fixed between the first supporter 100a and the second supporter 111b.

That is, the inner circumferential groove 611 may be formed in the portion where the head portion of the coupling member 113 is supported in the first coupling hole 401 as shown in the figures. In an embodiment, the elastic member 112 may include an O-ring.

Further, the first coupling hole 401 may include two or more first coupling holes 401 spaced apart from each other, and the second coupling hole 402 may include two or more second coupling holes 402 spaced apart from each other. In this case, any of two or more coupling members 113 may be inserted in any of the two or more first coupling holes 401 and any of the two or more second coupling holes 402, which are aligned. In an embodiment, the two or more first coupling holes 401 may be axially spaced from each other, and the two or more second coupling holes 402 may be axially spaced from each other.

In this manner, as each elastic member 112 elastically supports each first supporter 100a and each second supporter 111b, which are aligned, widthwise and outwardly, and thereby, leads the supporter 111 and the housing 101 to be in close contact, a gap between the supporter 111 and the housing 101 caused by assembly tolerance, abrasion, and the like can be compensated for, and the supporter 111 can be only axially slidable together with the siding bar 102 without being moved widthwise. Thereby, noises caused by collision, and the like can be reduced, and the accuracy of the sensor 130 for detecting a position of the magnet holder 120 coupled to the supporter 111 can be improved, as shown in FIG. 8.

Figure 9:
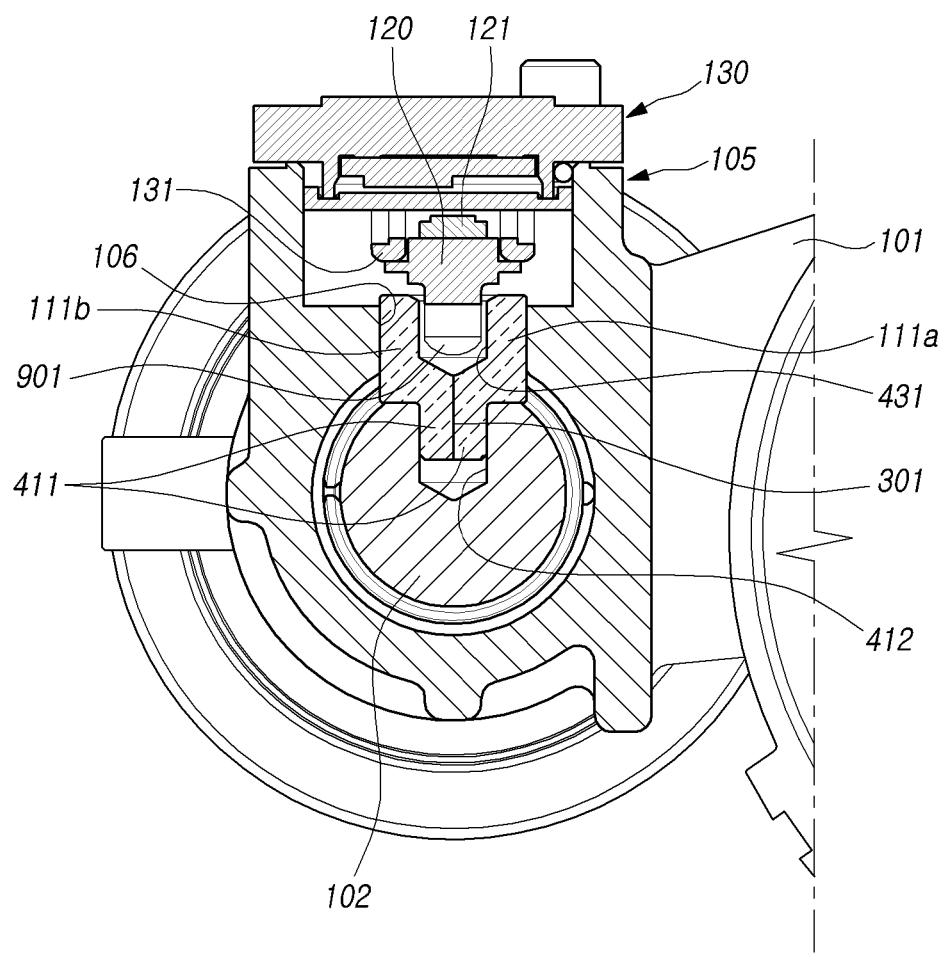

In addition, a first protrusion 411 may be formed to protrude from a portion or surface of the supporter 111 supported by, or contacting, the sliding bar 102, and the sliding bar 102 may include a first insertion hole 412 that is formed to be recessed from a surface thereof and allows the first protrusion 411 to be inserted, as shown in FIG. 9.

In a similar manner to the supporter 111, the first protrusion 411 may also be divided into two cut portions 301, and the two cut portions 301 of the first protrusion 411 may be formed in the first supporter 100a and the second supporter 111b, respectively. In this case, as the first supporter 100a and the second supporter 111b are inserted into the long hole 106 so that the first protrusion 411 can be inserted into the first insertion hall 412, the assembly of the first supporter 100a and the second supporter 111b can be easily performed before the coupling member 113 attaches the supporter 111 to the sliding bar 102.

Meanwhile, as described above, the sensor assembly 140 may include the sensor 130 and the magnet holder 120, and the sensor 130 can detect a position of the sliding bar 102. The magnet holder 120 can accommodate the magnet 121 and slide together with the rotation preventer 110 with being coupled to the rotation preventer 110, and the sensor 130 can detect a position of the magnet 121 with being coupled to the sensor holder 105 of the housing 101.

Figure 10:
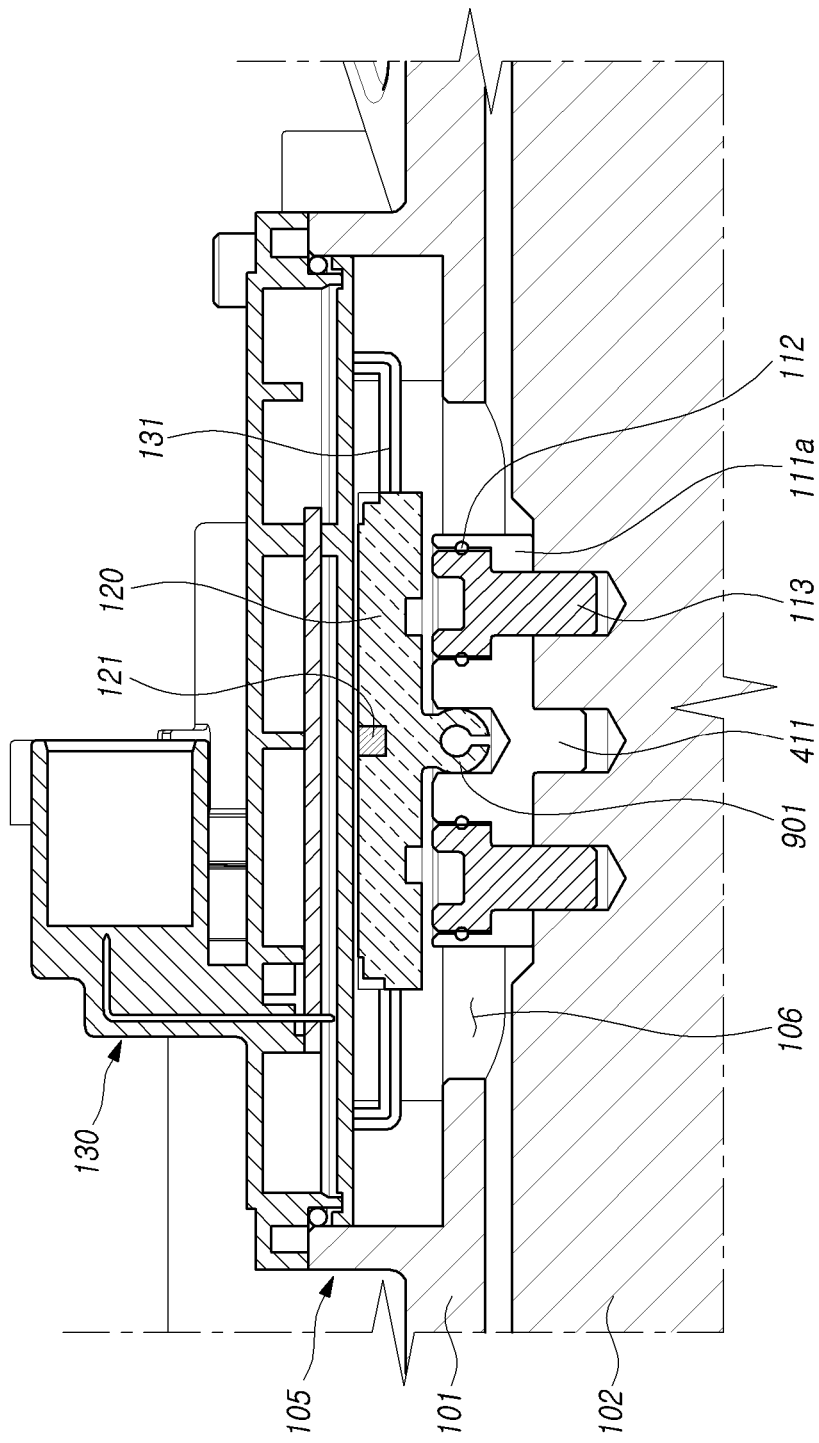

Referring to FIG. 10, the sensor 130 may be coupled to the sensor holder 105 and located to face the magnet holder 120 coupled to the rotation preventer 110.

That is, as the sliding bar 102 axially slides, the rotation preventer 110 and the magnet holder 120 can axially slide, and in turn, the sensor 130 can detect a position of the sliding bar 102 by detecting a position of the magnet 121, and determine whether the sliding of the sliding bar has been accurately performed by the motor 103.

A second protrusion 901 may be formed to protrude from a portion or surface of the magnet holder 120 facing the rotation preventer 110, and the supporter 111 may include a second insertion hole 431 that is formed to be recessed from a surface thereof and allows the second protrusion 901 to be inserted. Thereby, the magnet holder 120 can be coupled to the rotation preventer 110.

An outer surface of the second protrusion 901 can be formed in a curved surface so that the magnet holder 120 and the rotation preventer 110 can rotate relative to each other.

Referring to FIG. 11, one surface of the magnet holder 120 and one surface of the rotation preventer 110 facing the one surface of the magnet holder 120 may be spaced apart by a predetermined distance. Thereby, the magnet holder 120 and the rotation preventer 110 can rotate relative to each other in a situation where the second protrusion 901 is inserted into the second insertion hole 431.

That is, the sliding bar 102 may be bent due to road impact or the like, and in order to prevent the accuracy of the sensor 130 from being degraded due to the movement of the magnet holder 120 caused by the bending of the sliding bar 102, such relative rotation of the magnet holder 120 and the rotation preventer 110 can serve to offset the bending of the sliding bar 102.

As described in further detail below, the magnet holder 120 may be coupled to the guide portion 131. Thereby, the movement of the magnet holder 120 caused by the bending of the sliding bar 102 can be prevented or reduced, and the magnet holder 120 can only axially slide through the guide of the guide portion 131.

As shown in the figures, the second protrusion 901 may be formed in a substantially spherical shape, include an elastic piece formed to be bendable, and be inserted into the second insertion hole 431.

Further, the sensor 130 may include the guide portion 131 for guiding the sliding of the magnet holder 120. Thereby, the relative rotation of the magnet holder 120 and the rotation preventer 110 can enable the bending of the sliding bar 102 to be offset, and the magnet holder 120 can be guided by the guide portion 131 and only axially slide.

Referring to FIG. 12, two guide portions 131 spaced apart widthwise from each other may be formed to protrude from a portion or surface of the sensor 130 supported by, or contacting, the sensor holder 105, and the magnet holder 120 may be inserted between the guide portions 131.

That is, the guide portions 131 may be formed to axially extend and be supported on both widthwise surfaces of the magnet holder 120, respectively, leading the sliding of the magnet holder 120 to be guided, as shown in FIGS. 8 and 9.

Each of the guide portions 131 may be axially spaced apart from a portion or surface of the sensor 130, and include two protrusions 1211 that are formed to protrude and a connection portion 1212 that connects the edges of the protrusions 1211.

That is, the connection portion 1212 is spaced apart from the portion or surface of the sensor 130 and is supported on both widthwise surfaces of the magnet holder 120.

Referring to FIG. 13, on both widthwise surfaces of the magnet holder 120, a first supporter 1201 supported by the connection portion 1212 between one surface of the sensor 130 and the connection portion 1212, and a second supporter 1202 located on the opposite side of the first supporter 1201 and supported by the connection portion 1212 are formed to protrude, and the magnet holder 120 can be therefore coupled to the sensor 130.

That is, as the connection portion 1212 is located between the first supporter 1201 and the second supporter 1202, the magnet holder 120 can be guided along the connection portion 1212 and only axially slide.

The first supporter 1201 and the second supporter 1202 may be formed to axially extend, or one or more first supporters 1201 and one or more second supporters 1202 may be disposed to be axially spaced apart from each other. Thereby, it is possible to prevent or reduce a movement of the magnet holder 120.

FIG. 13 illustrates the embodiment in which the first supporters 1201 are axially spaced apart, and the second supporter 1202 axially extends. Accordingly, the areas of the first supporters 1201 and the second supporter 1202 supported by the connection portion 1212 can be increased, and thereby, the movement of the magnet holder 120 can be effectively prevented.

In addition, the first supporter 1201 may be formed to be inclined such that a height of a portion of the first supporter 1201 facing one surface of the sensor 130 is relatively low, and a height of a portion of the first supporter 1201 supported by the connection portion 1212 is relatively high.

That is, the first supporter 1201 may be formed in a substantially wedge shape, and thereby, the magnet holder 120 can be easily inserted between the guide portions 131.

Using above described structure, as the magnet holder 120 is guided by the guide portions 131 of the sensor 130, even when the sliding bar 102 is bent, such bending can be offset and the degradation of the accuracy of the sensor 130 can be prevented.

In the steer-by-wire steering apparatuses according to the embodiments herein, it is possible to reduce noise by compensating for a gap caused by abrasion on the rotation preventer for preventing the sliding bar from rotating as the sliding bar connected to a vehicle wheel slides, improve the accuracy of the sensor for detecting a position of the sliding bar, and prevent the degradation of the accuracy of the sensor due to movement or bending of the sliding bar.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATION

If applicable, this application claims the priority benefit under 35 U.S.C § 119(a) of Patent Application No. 10-2019-0089496, filed on Jul. 24, 2019 in Republic of Korea, the entire contents of which are incorporated herein by reference. In addition, this non-provisional application claims priorities in countries other than the U.S. for the same reason based on the Korean Patent Application, the entire contents of which are hereby incorporated by reference.

What is claimed is:

1. A steer-by-wire steering apparatus comprising:
a housing accommodating a sliding bar being axially slidable, and including a sensor holder including a long hole formed to penetrate inner and outer surfaces and axially extend;
a rotation preventer including a supporter that is inserted into the long hole, coupled to the sliding bar, and supported widthwise by the housing, the supporter being divided widthwise into two cut portions including a first supporter and a second supporter, and further including an elastic member located between the first supporter and the second supporter; and
a sensor assembly including a magnet holder that is coupled with the rotation preventer, is slidable together with the rotation preventer, and accommodates a magnet, and a sensor that is coupled to the sensor holder and detects a position of the magnet,
wherein the rotation preventer further includes a coupling member that is inserted into a first coupling hole formed in the supporter and divided into two cut portions, and a second coupling hole formed in the sliding bar, wherein the first coupling hole includes two or more first coupling holes spaced apart from each other, and the second coupling hole includes two or more second coupling holes spaced apart from each other, and wherein any of two or more coupling members is inserted in any of the two or more first coupling holes and any of the two or more second coupling holes, which are aligned.

2. The steer-by-wire steering apparatus according to claim 1,
wherein the elastic member is located between an outer surface of the coupling member and an inner surface of the first coupling hole.

3. The steer-by-wire steering apparatus according to claim 2, wherein the sliding bar includes a chamfered portion for supporting the supporter.

4. The steer-by-wire steering apparatus according to claim 2, wherein the coupling member is screwed to the second coupling hole, and the first coupling hole includes a step portion in which a head of the coupling member is supported.

5. The steer-by-wire steering apparatus according to claim 2, wherein an inner circumferential groove in which the elastic member is inserted is formed on an inner circumferential surface of the first coupling hole.

6. The steer-by-wire steering apparatus according to claim 2, wherein the elastic member includes an O-ring.

7. The steer-by-wire steering apparatus according to claim 2, wherein a first protrusion is formed to protrude from a portion or surface of the supporter supported by, or contacting, the sliding bar, and the sliding bar includes a first insertion hole that is formed to be recessed from a surface thereof and allows the first protrusion to be inserted.

8. The steer-by-wire steering apparatus according to claim 1, wherein a second protrusion is formed to protrude from a portion or surface of the magnet holder facing the rotation preventer, and the supporter includes a second insertion hole that is formed to be recessed from a surface thereof and allows the second protrusion to be inserted.

9. The steer-by-wire steering apparatus according to claim 8, wherein an outer surface of the second protrusion is formed in a curved surface.

10. The steer-by-wire steering apparatus according to claim 8, wherein two guide portions spaced apart widthwise from each other are formed to protrude from a portion or surface of the sensor supported by, or contacting, the sensor holder, and the magnet holder is inserted between the guide portions.

11. The steer-by-wire steering apparatus according to claim 10, wherein each of the guide portions is axially spaced apart from a portion or surface of the sensor, and includes two protrusions formed to protrude and a connection portion connecting edges of the protrusions.

12. The steer-by-wire steering apparatus according to claim 11, wherein a first magnet holder supporter supported by the connection portion between the portion or surface of the sensor and the connection portion, and a second magnet holder supporter located on the opposite side of the first magnet holder supporter and supported by the connection portion are formed to protrude on both widthwise surfaces of the magnet holder.

13. The steer-by-wire steering apparatus according to claim 12, wherein the first magnet holder supporter is formed to be inclined such that a height of a portion of the first magnet holder supporter facing the portion or surface of the sensor is relatively low, and a height of a portion of the first magnet holder supporter supported by the connection portion is relatively high.

14. A steer-by-wire steering apparatus comprising:
a housing accommodating a sliding bar being axially slidable, and including a sensor holder including a long hole formed to penetrate inner and outer surfaces and axially extend;
a rotation preventer including a supporter that is inserted into the long hole, coupled to the sliding bar, and supported widthwise by the housing, the supporter being divided widthwise into two cut portions including a first supporter and a second supporter, and further including an elastic member located between the first supporter and the second supporter; and
a sensor assembly including a magnet holder that is coupled with the rotation preventer, is slidable together with the rotation preventer, and accommodates a magnet, and a sensor that is coupled to the sensor holder and detects a position of the magnet,
wherein an insertion protrusion is formed to protrude from a portion or surface of the magnet holder facing the rotation preventer, and the supporter includes an insertion hole that is formed to be recessed from a surface thereof and allows the insertion protrusion to be inserted,
wherein two guide portions spaced apart widthwise from each other are formed to protrude from a portion or surface of the sensor supported by, or contacting, the sensor holder, and the magnet holder is inserted between the guide portions,
wherein each of the guide portions is axially spaced apart from a portion or surface of the sensor, and includes two guide protrusions formed to protrude and a connection portion connecting edges of the guide protrusions.

* * * * *